United States Patent [19]

Yasui et al.

[11] Patent Number: 4,821,602
[45] Date of Patent: Apr. 18, 1989

[54] SUPPORT STRUCTURE OF DIFFERENTIAL GEAR UNIT

[75] Inventors: Yasuyoshi Yasui; Tatsuji Suganuma, both of Toyota, Japan

[73] Assignee: Toyota Jidosha Kabushiki Kaisha, Toyota, Japan

[21] Appl. No.: 116,176

[22] Filed: Nov. 3, 1987

[30] Foreign Application Priority Data

Nov. 4, 1986 [JP] Japan .......................... 61-169300[U]

[51] Int. Cl.⁴ ............................................. F16H 1/40
[52] U.S. Cl. ......................................... 74/713; 74/607
[58] Field of Search .................. 74/606 R, 607, 710, 74/710.5, 711, , 713

[56] References Cited

U.S. PATENT DOCUMENTS

| | | | |
|---|---|---|---|
| 3,308,682 | 3/1967 | Puidokas | 74/713 X |
| 3,323,844 | 6/1967 | Hedstrom | 74/713 X |
| 3,901,103 | 8/1975 | Hufstader | 74/713 |
| 4,103,567 | 8/1978 | Franco et al. | 74/710 |
| 4,217,794 | 8/1980 | Yasui et al. | 74/700 |
| 4,244,242 | 1/1981 | Uno et al. | 74/713 X |
| 4,261,219 | 4/1981 | Suzuki et al. | 74/710 X |
| 4,341,281 | 7/1982 | Nagy | 74/710 X |
| 4,583,424 | 4/1986 | von Hiddessen et al. | 74/711 X |
| 4,597,311 | 7/1986 | Takeda | 74/694 |
| 4,625,584 | 12/1986 | Onodera | 74/713 |
| 4,703,671 | 11/1987 | Jikihara | 74/710.5 |

FOREIGN PATENT DOCUMENTS 60-164046  8/1985  Japan .................................... 74/710

Primary Examiner—Leslie A. Braun
Assistant Examiner—Dwight G. Diehl
Attorney, Agent, or Firm—Cushman, Darby & Cushman

[57] ABSTRACT

In a trans-axle casing having an open end closed by a removable cover member secured thereto, a differential gear unit is rotatably supported at its side-journals by a pair of tapered roller bearings which are removably coupled within each cylindrical bore in a pair of axially spaced carrier portions of the casing. The carrier portions each are formed with a radial slit which extends inwardly from an upright seating face of the casing and opens into an annular groove in the cylindrical bore. A shim plate of substantially rectangular shape is inserted into each of the carrier portions through the radial slit and engaged at a semi-circular inner end thereof with the annular groove to retain each of the bearings in place by engagement therewith, the shim plate being formed in a predetermined length to be retained in place by engagement with the cover member of the casing at its outer end when it has been fully engaged at its inner end with the annular groove.

5 Claims, 2 Drawing Sheets

SUPPORT STRUCTURE OF DIFFERENTIAL GEAR UNIT

BACKGROUND OF THE INVENTION

1. Field of the Invention

The present invention relates to a differential gear unit assembled in a trans-axle casing, and more particularly to a support structure of the differential gear unit in the trans-axle casing.

2. Description of the Prior Art

In a differential gear unit assembled in a trans-axle casing having an open end closed by a removable cover member fastened thereto, the outer case of the differential gear unit has a pair of side-journals rotatably supported by a pair of tapered roller bearings which are carried on a pair of axially spaced carrier portions of the trans-axle casing. In such a conventional support structure of the differential gear unit, the carrier portions of the trans-axle casing each are formed therein with a semi-cylindrical bore, and the tapered roller bearings each are coupled with the semi-cylindrical bore of the carrier portion and retained in place by means of a retainer member secured to the carrier portion. For the purpose of eliminating such additional parts as the retainer members, it has been proposed to form a cylindrical bore in the carrier portions of the trans-axle casing respectively for supporting therein the tapered roller bearing in a fluid-tight manner. In this case, the cylindrical bore of the carrier portion is formed, in general, at its intermediate portion with an annular groove in which a snap ring is engaged to retain the tapered roller bearing in an axial direction. For engagement with the annular groove, the snap ring must be inserted into the cylindrical bore of the carrier portion from its one end. If an internal surface of the cylindrical bore is damaged by the snap ring in the course of insertion into the carrier portion, unexpected leakage of lubricating oil will occur at the carrier portions. Moreover, the snap ring must be compressed radially inwardly for insertion into the cylindrical bore of the carrier portion. In the case that the annular groove is formed as a shallow annular groove to facilitate insertion of the snap ring, the engagement face of the snap ring with a side wall of the groove is inevitably reduced. As a result, the snap ring is apt to be deformed and removed due to an increase of the thrust force acting thereon from the tapered roller bearing.

SUMMARY OF THE INVENTION

An object of the present invention is to provide an improved support structure of the differential gear unit which allows to overcome the drawbacks discussed above. In other words, the object of the present invention is directed to provide a support structure of the differential gear unit wherein the tapered roller bearings each can be retained in place within the cylindrical bore of the carrier portion without causing the drawbacks discussed above.

The object of the present invention is achieved by a support structure of a differential gear unit assembled in a trans-axle casing having a pair of axially spaced carrier portions and an open end closed by a removable cover member secured thereto, the outer case of the gear unit having a pair of side-journals rotatably supported by a pair of tapered roller bearings which are removably coupled within each cylindrical bore in the carrier portions of the trans-axle casing, wherein the cylindrical bores in the carrier portions each are formed with an annular groove which is located in a predetermined position where each outer race of the bearings is positioned to be slightly protruded outwards in an axial direction, the carrier portions each being formed therein with a radial slit which extends inwardly from an upright seating face of the trans-axle casing and opens into a portion of the annular groove, and wherein a shim plate of substantially rectangular shape is inserted into each of the carrier portions through the radial slit and engaged at a semi-circular inner end thereof with the annular groove to retain each of the bearings in place by engagement therewith, the shim plate being formed at a central portion thereof with an opening which is slightly larger in diameter than the internal diameter of the outer race of the bearing and being formed in a predetermined length to be retained in place by engagement with the cover member at an outer end thereof when it has been fully engaged at the inner end thereof with the annular groove.

In the support structure described above, the shim plates each act as a retainer to retain the tapered roller bearings in place and act as an adjuster to adjust the preload acting on the bearings and the backlash between a ring gear mounted on the gear unit and a drive pinion in mesh with the ring gear.

BRIEF DESCRIPTION OF THE DRAWINGS

Other objects, features and advantages of the present invention will be readily appreciated by the following detailed description of a preferred embodiment thereof when considered with reference to the accompanying drawings, in which.

DESCRIPTION OF THE PREFERRED EMBODIMENT

Figure 1:
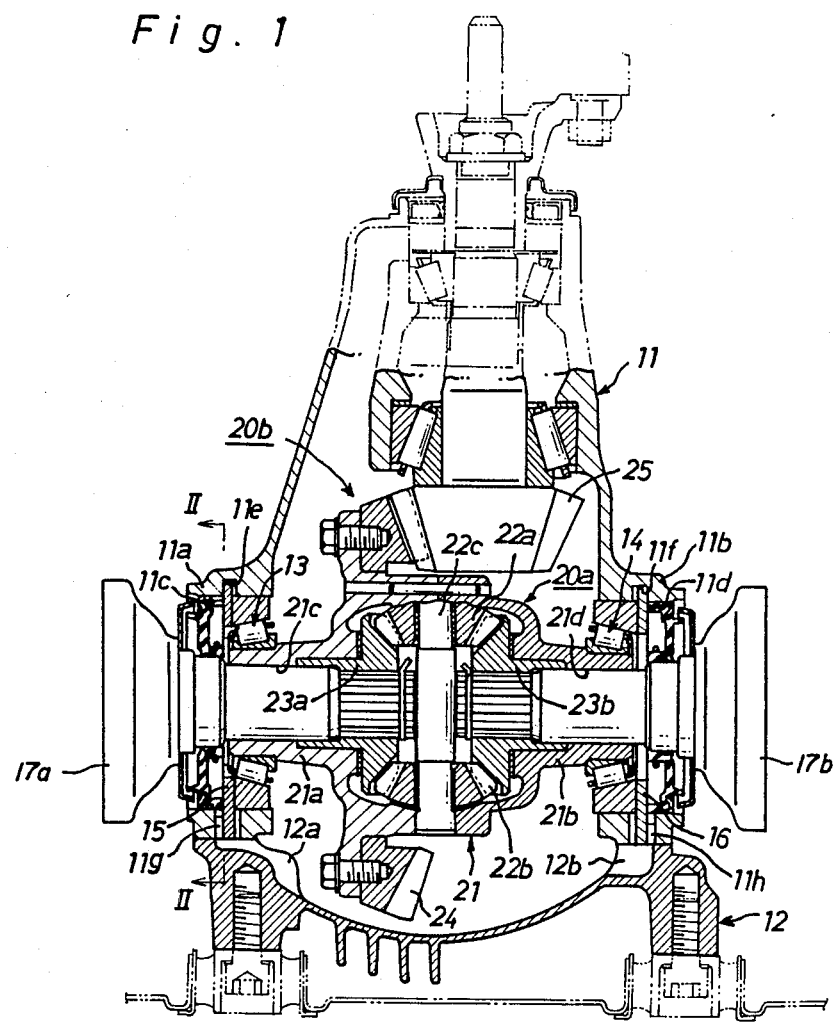
FIG. 1 is a sectional view of a final speed-reduction gearing assembly equipped with a support structure of a differential gear unit in accordance with the present invention.

Referring now to the drawings, in particular to FIG. 1, there is illustrated a final speed-reduction gearing assembly which includes a trans-axle casing 11 arranged in a fore-and-aft direction of a motor vehicle, a removable dome-shaped cover member 12 secured to an upright rear seating face of trans-axle casing 11 to close a rearward open end of casing 11, and a differential gear unit 20a and a final drive gearing 20b assembled in the trans-axle casing 11. The differential gear unit 20a comprises an outer case 21 having a pair of side-journals 21a, 21b, a pair of pinions 22a, 22b rotatably supported in the outer case 21 by means of a pinion shaft 22c, and a pair of side gears 23a, 23b rotatably supported by the side-journals 21a, 21b and in mesh with the pinions 22a, 22b. The side-journals 21a, 21b of outer case 21 are rotatably supported by a pair of tapered roller bearings 13, 14 which are carried on a pair of axially spaced carrier portions 11a, 11b of trans-axle casing 11. The carrier portion 11a is formed with a cylindrical bore 11c for supporting therein the tapered roller bearing 13, while the carrier portion 11b is formed with a cylindrical bore 11d for supporting therein the tapered roller bearing 14. A pair of axle shafts 17a, 17b are rotatably supported at 21c, 21d by means of the respective side-journals 21a, 21b and splined to the respective side gears 23a, 23b for rotation therewith. The axle shafts 17a, 17b are extended outwardly from the trans-axle casing 11 through a pair of seal members assembled in the respective cylindrical bores 11c, 11d of carrier portions 11a, 11b.

The final drive gearing 20b comprises a ring gear 24 mounted on the outer case 21 of differential gear unit 20a for rotation therewith, and a drive pinion 25 in mesh with the ring gear 24. The drive pinion 25 is integrally formed with an input shaft which is arranged in the fore-and-aft direction of the motor vehicle and rotatably supported by a pair of tapered roller bearings carried on the casing 11 in a fluid-tight manner. The power from a prime mover of the vehicle is transmitted to the differential gear unit 20a through the drive pinion 25 and ring gear 24, and the differential gear unit 20a acts to distribute the power to the axle shafts 15a and 15b.

Figure 2:
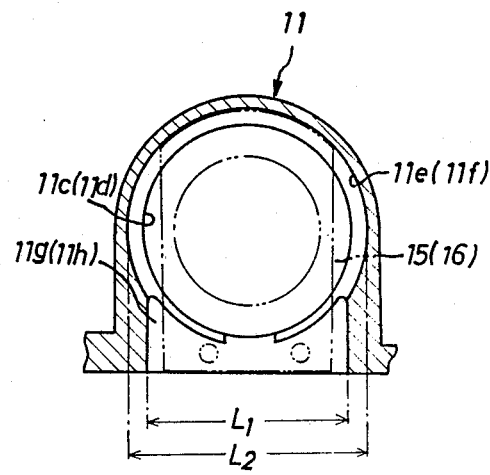
FIG. 2 is a cross-sectional view taken along line II—II in FIG. 1.

The cylindrical bore 11c in carrier portion 11a is formed with an annular groove 11e, while the cylindrical bore 11d in carrier portion 11b is formed with an annular groove 11f. The annular grooves 11e, 11f each are formed with a predetermined width and located in a predetermined position where the respective outer races 13a, 14a of bearings 13, 14 are positioned to be slightly protruded outwards in an axial direction. The carrier portion 11a is further formed with a radial slit 11g which extends inwardly from the upright rear seating face of casing 11 and opens into the annular groove 11e, while the carrier portion 11b is further formed with a radial slit 11h which extends inwardly from the upright rear seating face of casing 11 and opens into the annular groove 11f. As shown in FIG. 2, each width $L_1$ of the radial slits 11g, 11h in a radial direction is determined to be smaller than each diameter $L_2$ of the annular grooves 11e, 11f, and each width of the radial slits 11g, 11h in an axial direction is determined to be larger than the width of the respective annular grooves 11e, 11f.

Figure 3:
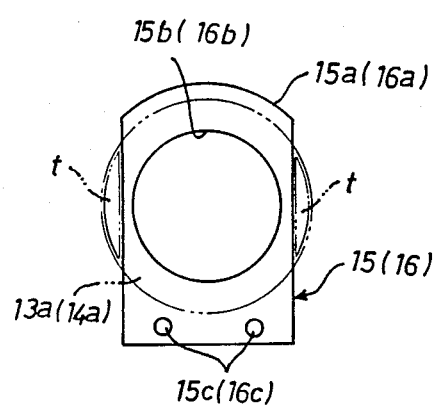
FIG. 3 is a front view of a shim for retaining a tapered roller bearing shown in FIG. 1.

In the support structure of the differential gear unit 20a, a pair of shim plates 15, 16 are inserted into the respective carrier portions 11a, 11b of casing 11 through the respective radial slits 11g, 11h and engaged with the respective annular grooves 11e, 11f at their inner ends to retain the tapered roller bearings 13, 14 in place by engagement therewith. As shown in FIGS. 2 and 3, the shim plates 15, 16 each are in the form of a flat plate of substantially rectangular shape which is smaller in width than the respective radial slits 11g, 11h and smaller in thickness than the width of respective annular grooves. 11e, 11f. The shim plate 15 is formed with a semi-circular inner end 15a to be coupled with the annular groove 11e when it has been inserted into the carrier portion 11a, while the shim plate 16 is formed with a semi-circular inner end 16a to be coupled with the annular groove 11f when it has been inserted into the carrier portion 11b. The shim plates 15, 16 each are formed in a length to be engaged at their outer ends with the cover member 12 when fully engaged at their inner ends 15a, 16a with the respective annular grooves 11e, 11f. The shim plate 15 is further formed at its central portion with an opening 15b which is slightly larger in diameter than the internal diameter of the outer race 13a of bearing 13, while the shim plate 16 is further formed at its central portion with an opening 16b which is slightly larger in diameter than the internal diameter of the outer race 14a of bearing 14. In addition, the shim plate 15 is formed at its outer end portion with a pair of holes 15c for engagement with a takeout tool (not shown), while the shim plate 16 is formed at its outer end portion with a pair of holes 16c for engagement with the takeout tool. When fully engaged at their inner ends 15a, 16a with the annular grooves 11e, 11f as shown in FIG. 1, the shim plates 15, 16 each act as a retainer to retain the tapered roller bearings 13, 14 in place and act as an adjuster to adjust the preload acting on the bearings 13, 14 and the backlash between the ring gear 24 and the drive pinion 25.

Figure 4:
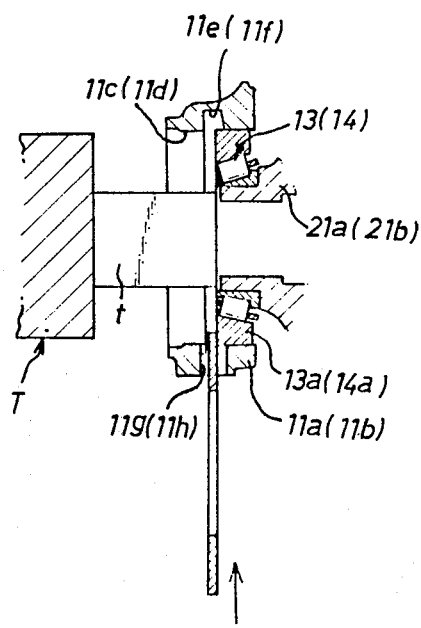
FIG. 4 is a view showing assembly processes of the shim plate.
Figure 5:
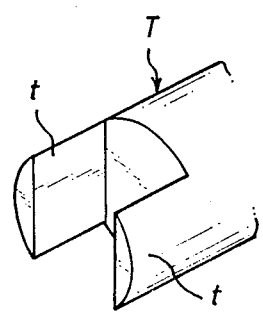
FIG. 5 a perspective view of a pressure tool for use in the assembly processes shown in FIG. 4.

Hereinafter, the assembly process of the differential gear unit 20a in the trans-axle casing 11 will be described with reference to FIGS. 3-4. Assuming that the right-hand shim plate 16 has been inserted into the right-hand carrier portion 11b of trans-axle casing 11 through the right-hand radial slit 11h and engaged with the annular groove 11f in carrier portion 11b and that the differential gear unit 20a has been inserted into the trans-axle casing 11 from the rearward open end thereof, the tapered roller bearings 13, 14 are coupled over the side-journals 21a, 21b of gear unit 20a and coupled within the respective cylindrical bores 11c, 11d of carrier portions 11a, 11b. In such a condition, a pressure tool T shown in FIG. 5 is inserted into the cylindrical bore 11c of the left-hand carrier portion 11a of casing 11 and engaged at its radially spaced projections with the outer race 13a of the left-hand bearing 13. Thus, the outer race 13a is axially inwardly urged by a thrust force applied thereto from the pressure tool T to provide a space for insertion of the left-hand shim plate 15 into the annular groove 11e. As shown by an arrow in FIG. 4, the left-hand shim plate 15 is radially inwardly inserted into the left-hand carrier portion 11a through the radial slit 11g and a space between the projections t of tool T and engaged at its semi-circular inner end 15a with the annular groove 11e in carrier portion 11a. Thereafter, the cover member 12 is secured to the upright rear seating face of trans-axle casing 11 so that both the shim plates 15, 16 are retained in place by engagement with a pair of axially spaced projections 12a, 12b formed on the internal wall of cover member 12.

When the tapered roller bearings 13, 14 have been defaced, it is required to replace them with fresh ones. In such a situation, the cover member 12 is removed from the trans-axle casing 11 for replacement of the defaced bearings with fresh ones, and the axle shafts 17a, 17b are removed from the differential gear unit 20a. Thus, the shim plates 15, 16 can be drawn outwardly from the carrier portions 11a, 11b by means of the takeout tool engaged therewith at holes 15c, 16c, and in turn, the defaced bearings 13, 14 can be removed from the side-journals 21a, 21b of gear unit 20a.

Although a certain specific embodiment of the present invention has been illustrated and described herein, it is obvious that many modifications thereof are possible. The invention, therefore, it is not intended to be restricted to the exact showing of the drawings and description thereof, but is considered to include reasonable and obvious equivalents.

What is claimed is:

1. A support structure of a differential gear unit assembled in a trans-axle casing having a pair of axially spaced carrier portions and an open end closed by a removable cover member secured thereto, an outer case of said gear unit having a pair of side journals rotatable supported by a pair of tapered roller bearings which are removably coupled within respective cylindrical bores in the carrier portions of said trans-axle casing, wherein the cylindrical bores in said carrier portions each are formed with an annular groove which is located in a predetermined position where an outer race of each of said bearings extends axially to interfere with said grooves, said carrier portions each being formed therein with a radial slit which extends inwardly from an upright seating face of said trans-axle casing and opens into said annular groove, and wherein a shim plate of substantially rectangular shape is inserted into each of said carrier portions through said radial slit and engaged at a semi-circular inner end thereof with said annular groove to retain each of said bearings in place by engagement therewith, said shim plate being formed at a central portion thereof with an opening which is arranged coaxially with the outer race of said bearing and being formed in a predetermined length to be retained in place by engagement with said cover member at an outer end thereof when it has been fully engaged at the inner end thereof with said annular groove.

2. A support structure of a differential gear unit as claimed in claim 1, wherein the radial slit in said carrier portion has a radial width smaller than a diameter of said annular groove and said shim plate is smaller in width than said radial slit and smaller in thickness than a width of said annular groove.

3. A support structure of a differential gear unit as claimed in claim 1, wherein said shim plate is formed at an outer end portion thereof with at least a hole for engagement with a tool.

4. A support structure of a differential gear unit as claimed in claim 1, wherein said cover member is integrally formed at an internal wall thereof with a pair of projections for engagement with the respective outer ends of said shim plates.

5. A support structure of a differential gear unit as claimed in claim 1, wherein said radial slit has an axial width larger than a width of said annular groove.

* * * * *